US007756920B2

(12) United States Patent
Muller et al.

(10) Patent No.: US 7,756,920 B2
(45) Date of Patent: Jul. 13, 2010

(54) RESUBMISSION OF MEDIA FOR NETWORK-BASED DISTRIBUTION

(75) Inventors: Max Muller, San Jose, CA (US); Ricardo Cortes, Los Gatos, CA (US); Charles Stephenson Spillar, Cupertino, CA (US); Richard Todd Hunter, Sunnyvale, CA (US); Gregory Robbin, Mountain View, CA (US); Robert H. Kondrk, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 11/946,711

(22) Filed: Nov. 28, 2007

(65) Prior Publication Data

US 2009/0138539 A1 May 28, 2009

(51) Int. Cl.
*G06F 15/16* (2006.01)

(52) U.S. Cl. ...................................... 709/201; 709/219

(58) Field of Classification Search ......... 709/200–203, 709/217–227, 228
See application file for complete search history.

(56) References Cited

U.S. PATENT DOCUMENTS 5,752,128 A 5/1998 Yamashita
5,884,280 A 3/1999 Yoshioka et al.
6,085,253 A 7/2000 Blackwell et al.
6,226,618 B1 5/2001 Downs et al.
6,338,044 B1 1/2002 Cook et al.
6,385,596 B1 * 5/2002 Wiser et al. .................... 705/51
6,549,922 B1 4/2003 Srivastava et al.
6,691,149 B1 * 2/2004 Yokota et al. ............... 709/201
6,731,312 B2 5/2004 Robbin
6,873,992 B1 3/2005 Thomas
6,874,003 B2 3/2005 Morohashi
7,073,193 B2 7/2006 Marsh
7,209,892 B1 4/2007 Galuten et al.
7,383,233 B1 6/2008 Singh et al.
2001/0021926 A1 9/2001 Schneck et al.
2001/0044786 A1 11/2001 Ishibashi
2002/0002541 A1 1/2002 Williams
2002/0032658 A1 3/2002 Oki et al.
2002/0049844 A1 4/2002 Nishikawa
2002/0099661 A1 7/2002 Kii et al.
2002/0099696 A1 7/2002 Prince
2002/0099801 A1 7/2002 Ishii
2002/0107803 A1 8/2002 Lisanke et al.

(Continued)

FOREIGN PATENT DOCUMENTS

WO WO 00/08909 2/2000

(Continued)

OTHER PUBLICATIONS

"Liquifier Pro 4.0 for Windows™ User's Guide," 1998, Liquid Audio, Inc.

(Continued)

*Primary Examiner*—Moustafa M Meky

(57) ABSTRACT

Methods and systems for submitting or resubmitting media to a media distribution site are disclosed. The submission or resubmission of media to the media distribution site can be performed by numerous submitters in a uniform and computer-assisted manner. The submitted or resubmitted media can then be processed in a largely automated manner at the media distribution site and then made available for online purchase and distribution.

24 Claims, 12 Drawing Sheets

U.S. PATENT DOCUMENTS

| | | | | |
|---|---|---|---|---|
| 2002/0112171 | A1 | 8/2002 | Ginter et al. | |
| 2002/0116293 | A1 | 8/2002 | Lao et al. | |
| 2002/0124182 | A1 | 9/2002 | Basco et al. | |
| 2002/0152267 | A1 | 10/2002 | Lennon | |
| 2002/0152278 | A1 | 10/2002 | Pontenzone et al. | |
| 2002/0165811 | A1 | 11/2002 | Ishii et al. | |
| 2002/0186844 | A1 | 12/2002 | Levy et al. | |
| 2002/0198843 | A1 | 12/2002 | Wang et al. | |
| 2003/0005173 | A1 | 1/2003 | Shah et al. | |
| 2003/0065717 | A1* | 4/2003 | Saito et al. | 709/203 |
| 2003/0074465 | A1 | 4/2003 | Tang et al. | |
| 2003/0115144 | A1 | 6/2003 | Stefik et al. | |
| 2003/0120593 | A1 | 6/2003 | Bansai et al. | |
| 2003/0135424 | A1 | 7/2003 | Davis et al. | |
| 2004/0012618 | A1* | 1/2004 | Finney | 345/703 |
| 2004/0015427 | A1 | 1/2004 | Camelio | |
| 2004/0059929 | A1 | 3/2004 | Rodgers et al. | |
| 2004/0167858 | A1 | 8/2004 | Erickson | |
| 2004/0205028 | A1 | 10/2004 | Verosub et al. | |
| 2004/0215733 | A1 | 10/2004 | Gondhalekar et al. | |
| 2004/0254883 | A1 | 12/2004 | Kondrk et al. | |
| 2004/0254949 | A1 | 12/2004 | Amirthalingam | |
| 2004/0267552 | A1 | 12/2004 | Gilliam et al. | |
| 2004/0268451 | A1 | 12/2004 | Robbin et al. | |
| 2005/0021478 | A1 | 1/2005 | Gautier et al. | |
| 2005/0034164 | A1* | 2/2005 | Sano et al. | 725/91 |
| 2005/0038813 | A1 | 2/2005 | Apparao et al. | |
| 2005/0050218 | A1 | 3/2005 | Sheldon et al. | |
| 2005/0050345 | A1 | 3/2005 | Dowdy et al. | |
| 2005/0182792 | A1 | 8/2005 | Israel et al. | |
| 2005/0240529 | A1 | 10/2005 | Thomas | |
| 2005/0267894 | A1 | 12/2005 | Camahan | |
| 2006/0015489 | A1 | 1/2006 | Probst et al. | |
| 2006/0041748 | A1 | 2/2006 | Lockhart et al. | |
| 2006/0074754 | A1 | 4/2006 | Toyohara et al. | |
| 2006/0161604 | A1 | 7/2006 | Lobo | |
| 2007/0011156 | A1 | 1/2007 | Maron | |
| 2007/0083471 | A1 | 4/2007 | Robbin et al. | |
| 2007/0192352 | A1 | 8/2007 | Levy | |
| 2007/0265969 | A1 | 11/2007 | Horwat et al. | |
| 2007/0266028 | A1 | 11/2007 | Muller et al. | |
| 2007/0266047 | A1 | 11/2007 | Cortes et al. | |

FOREIGN PATENT DOCUMENTS

| | | |
|---|---|---|
| WO | WO 02/48920 | 6/2002 |

OTHER PUBLICATIONS

Radified Guide to Ripping & Encoding CD Audio, http://mp3.radified.com, downloaded Oct. 7, 2003, pp. 1-5.

“Music Collector Features,” Collectorz.com music collector features, http://www.collectorz.com/music/features.php, downloaded Oct. 7, 2003, pp. 1-2.

“Gracenote CDDB,” Gracenote, product webpage, http://www.gracenote.com/gn_products/cddb/html, downloaded Oct. 7, 2003, pp. 1-2.

“Gracenote MusicID,” Gracenote, product webpage, http://www.gracenote.com/gn_products/music_id.html, downloaded Oct. 7, 2003, pp. 1-2.

“AVCataloger Overview,” NC Software, Inc., http://www.avcataloger.com/Products.aspx, downloaded Oct. 6, 2003, pp. 1-4.

Jyri Huopaniemi, “Music Encoding and Transmission,” CUIDAD meeting, ICMC ’2000 Berlin, Aug. 28, 2000.

“Media Encoding FAQ,” Loudeye Corp., http://www.loudeye.com/digitalmedia/solutions/mediaenchost/enclodingfaq.asp, downloaded Oct. 9, 2003, pp. 1-3.

“Media encoding datasheet,” Loudeye Corp., http://www.loudeye.com/digitalmedia/solutions/mediaenchost/encloding.asp, downloaded Oct. 9, 2003, pp. 1-4.

“Media hosting datasheet,” Loudeye Corp., http://www.loudeye.com/digitalmedia/solutions/mediaenchost/hosting.asp, downloaded Oct. 9, 2003, pp. 1-2.

“Preview and Convera Announce availability of Digital Media Commerce Platform for Secure Digital Audio Devices,” Convera press release, Las Vegas, NV, Consumer Electronics Show, Jan. 8, 2001, pp. 1-3.

Sonopress Global Network User Manual, Client Tools, Upload Data/Graphics Files to Sonopress, Sonopress, data unknown.

MPEG-7 Multimedia Description Schemes XM (Version 2.0), ISO/IEC, Mar. 2000, pp. 1-138.

U.S. Appl. No. 11/786,031 “Media Package Format for Submission to a Media Distribution System”, filed Apr. 9, 2007.

* cited by examiner

RESUBMISSION OF MEDIA FOR NETWORK-BASED DISTRIBUTION

CROSS-REFERENCE TO OTHER APPLICATIONS

This application references U.S. patent application Ser. No. 11/609,815, filed Dec. 12, 2006, entitled "TECHNIQUES AND SYSTEMS FOR ELECTRONIC SUBMISSION OF MEDIA FOR NETWORK-BASED DISTRIBUTION," which is herein incorporated by reference. This application also references U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION," which is hereby incorporated herein by reference.

BACKGROUND OF THE INVENTION

1. Field of the Invention

The present invention relates to electronic transmission of media and, more particularly, to electronic submission of media for purposes of media purchase and distribution.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years, music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

Today, various online media hosting sites permit virtual visitors to purchase and download albums or songs via the Internet (e.g., World Wide Web). However, in order for the albums or songs to be offered for purchase and download, the electronic content for the albums or songs must first be provided to the media hosting sites. Conventionally, a music label desirous of selling audio productions of their songs online produce a tape or CD and then physically mail the tape or CD to a representative for the media hosting site. Typically, a submission would include not only the audio productions of songs but also text and images associated with the songs. The text provides descriptive information (e.g., metadata) for the songs and the images pertain to associated artwork (e.g., cover art). More recently, music labels have electronically transmitted the audio production of their songs to a representative of the media hosting site. Unfortunately, there are various different means and formats by which various music labels submit their audio productions of songs and associated data. This problem is exacerbated by the large number of small music labels that make submissions. As a result, representatives of the media hosting site that receive the submissions face substantial burdens and difficulties due to the wide range of variation with respect to the submissions. Also, even when a submission has been achieved, there are difficulties when music labels subsequently need to change or alter the prior submission.

Thus, there is a need for improved approaches to submit media to an online media hosting site.

SUMMARY OF THE INVENTION

Broadly speaking, the invention relates to an improved system and method for submitting or resubmitting media to a media distribution site. The submission or resubmission of media to the media distribution site can be performed by numerous submitters in a uniform and computer-assisted manner. The submitted or resubmitted media can then be processed in a largely automated manner at the media distribution site and then made available for online purchase and distribution.

In one embodiment, the invention pertains to a method and system for controlled resubmission of digital media assets in a client-server environment. The resubmission capabilities provided by the invention enable users to modify previously submitted media asset data (e.g., updated media asset information and/or altered media content). The media content can, for example, be audio, video, or image data.

The invention can be implemented in numerous ways, including as a method, system, device, or apparatus (including graphical user interface and computer readable medium). Several embodiments of the invention are discussed below.

As a method for redelivering a digital media asset to a media distribution system, one embodiment of the invention can, for example, include at least: identifying a digital media asset to be redelivered, wherein the identified digital media asset was previously delivered to the media distribution system; receiving at least current media asset data for the identified digital media asset from the media distribution system; receiving a revision for at least a portion of the current media asset data to produce revised media asset data; and redelivering the revised media asset data to the media distribution system.

As a method for resubmitting a digital media asset to a media distribution system, one embodiment of the invention can, for example, include at least: identifying a digital media asset to be resubmitted; requesting current media asset information for the identified digital media asset from the media distribution system; receiving the current media asset information for the identified digital media asset from the media distribution system; receiving revisions to at least a portion of the current media asset information to produce updated media asset information; and submitting the updated media asset information to the media distribution system.

As a computer readable medium including at least tangibly computer program code stored thereon for redelivering a digital media asset to a media distribution system, one embodiment of the invention can, for example, include at least: computer program code for identifying a digital media asset to be redelivered, wherein the identified digital media asset was previously delivered to the media distribution system; computer program code for receiving at least current media asset data for the identified digital media asset from the media distribution system; computer program code for receiving at least one revision to at least a portion of the current media asset data to produce revised media asset data; and computer program code for redelivering the revised media asset data to the media distribution system.

As a computer readable medium including at least tangibly computer program code stored thereon for resubmitting a digital media asset to a media distribution system, one embodiment of the invention can, for example, include at least: computer program code for identifying a digital media asset to be resubmitted; computer program code for requesting current media asset information for the identified digital media asset from the media distribution system; computer program code for receiving the current media asset information for the identified digital media asset from the media distribution system; computer program code for associating updated media content to the updated media asset information; computer program code for revising at least a portion of the current media asset information to produce updated media asset information; and computer program code for submitting the updated media content and/or the updated media asset information to the media distribution system.

As a system, one embodiment of the invention can, for example, include at least: means for submitting a plurality of digital media assets to a media distribution system, where client media asset data pertaining to each of the digital media assets; means for identifying one of the digital media assets to be resubmitted; means for obtaining at least server media asset data for the identified digital media asset from the media distribution system; means for revising at least a portion of the server media asset data to produce revised client media asset data; and means for resubmitting the revised client media asset data to the media distribution system.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to an improved system and method for submitting or resubmitting media to a media distribution site. The submission or resubmission of media to the media distribution site can be performed by numerous submitters in a uniform and computer-assisted manner. The submitted or resubmitted media can then be processed in a largely automated manner at the media distribution site and then made available for online purchase and distribution.

In one embodiment, the invention pertains to a method and system for controlled resubmission of digital media assets in a client-server environment. The resubmission capabilities provided by the invention enable users to modify previously submitted media asset data (e.g., updated media asset information and/or altered media content). The media content can, for example, be audio, video, or image data.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
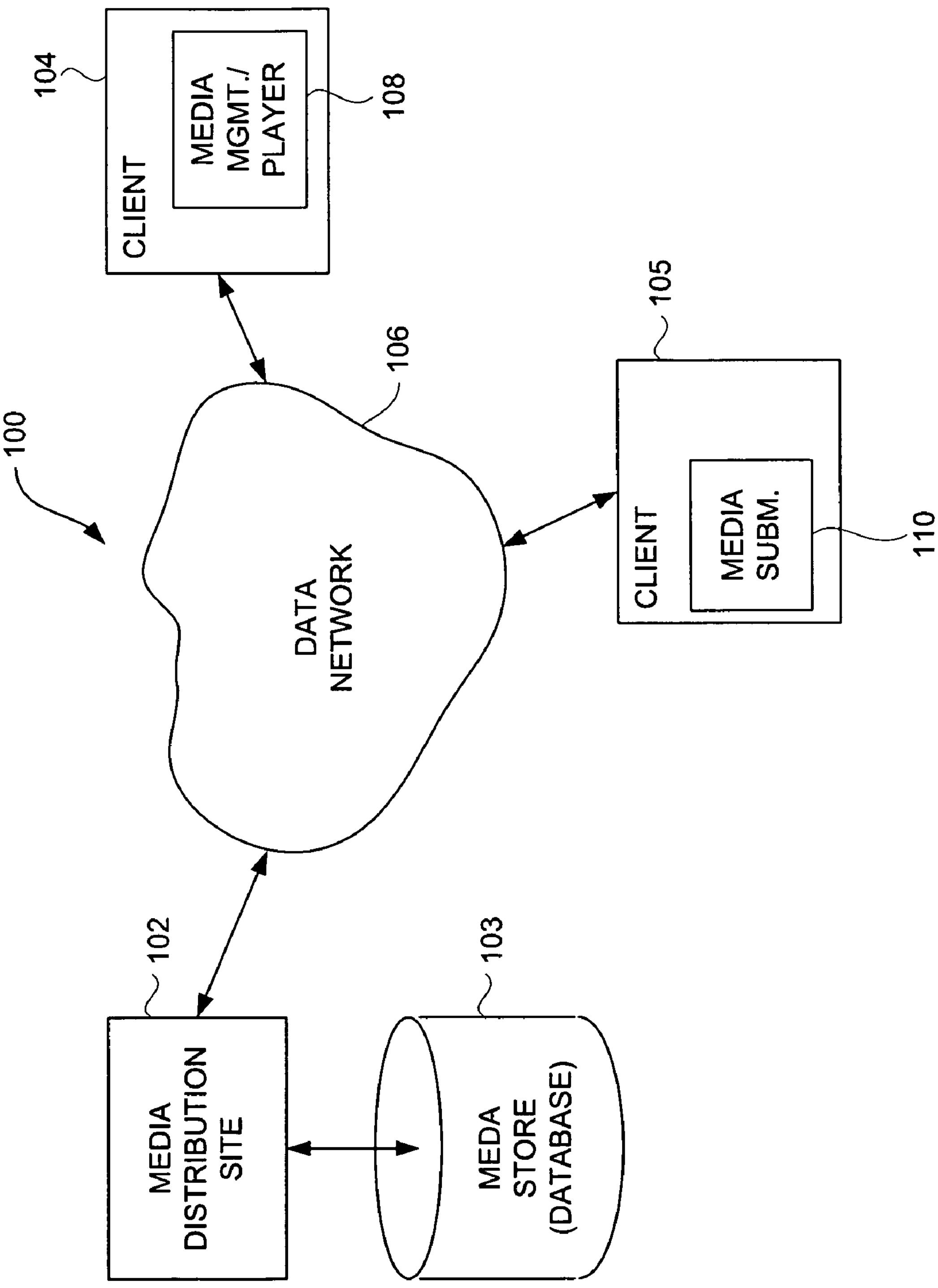
FIG. 1 is a block diagram of a media submission and distribution system according to one embodiment of the invention.

FIG. 1 is a block diagram of a media submission and distribution system 100 according to one embodiment of the invention. The media submission and distribution system 100 includes a media distribution site 102. The media distribution site 102 coordinates submission (receipt), resubmission, storage and purchase of media items. The media distribution site 102 stores media items in a media store 103. In one embodiment, the media store 103 is a database. The media store 103 provides mass storage of the numerous media items that are available for purchase. Once purchased, the media items can be accessed from the media store 103 over a data network 106 by way of the media distribution site 102.

The media submission and distribution system 100 also includes a first client 104 and a second client 105. Typically, the media submission and distribution system 100 would include a plurality of different clients 104, 105. The first client 104 includes a media management/player 108. The second client 105 includes a media submission program 110. Some clients can also include both the media management/player 108 and the media submission program 110. The media management/player 108 is an application program (e.g., software application) that operates on the first client 104, which is a computing device. One example of a suitable media management/player 108 is iTunes™ offered by Apple Inc. The first client 104 is coupled to the media distribution site 102 through the data network 106. Hence, any of the first clients 104 can interact with the media distribution site 102 to review, purchase and/or manage media items.

The media submission program 110 is also an application program (e.g., software application) that operates on the second client 105, which is a computing device. One example of a suitable media submission program is iTunes Producer™ offered by Apple Inc. The media submission program 110 is used to submit (or resubmit) media items to the media distribution site 102. Although the media management/player 108 and the media submission program 110 are shown in FIG. 1 as separate programs, it should be understood that such programs can be integrated into a single program or reside on the same second client.

In the media submission and distribution system 100 shown in FIG. 1, the media items are submitted to the media distribution site 102 by way of the media submission program 110. The media items that have been submitted (e.g., via the second client 105) are processed and then stored in the media store 103. Thereafter, the stored media items are available to be purchased from the media distribution site 102. Upon purchasing a particular media item, the media distribution site 102 permits the media content for the particular media item to be retrieved from the media store 103 and then delivered (e.g., downloaded) from the media distribution site 102 to the corresponding client 104 through the data network 106. In this regard, the media distribution site 102 obtains the media content corresponding to the particular media item from the media store 103 and downloads such content through the data network 106 to the client 104. The downloaded media content can then be stored on the client 104. In one embodiment, the downloaded media content is encrypted as received at the client 104 but is decrypted and then perhaps re-encrypted before persistent storage on the client 104. Thereafter, the media management/player 108 can present (e.g., play) the media content at the client 104.

The media submission and distribution system 100 allows a user of the client 104 to utilize the media player 108 to browse, search or sort through a plurality of media items that can be purchased from the media distribution site 102. The media management/player 108 may also allow the user to preview a media clip of the media items. In the event that the user of the media management/player 108 desires to purchase a particular media item, the user (via the media management/player 108) and the media distribution site 102 can engage in an online commerce transaction in which the user pays for access rights to the particular media item. In one embodiment, a credit card associated with the user is credited for the purchase amount of the particular media item.

Moreover, after one or more media items have been submitted to the media distribution site 102 by way of the media submission program 110, the user may desire to make one or more changes to the submission. For example, the user may desired to alter at least a portion of previously submitted media asset data. The media asset data can represent media asset information and/or alter media content. In one implementation, the media asset information can pertain to one or more of media identifiers (e.g., UPC/EAN), metadata (data descriptive of the media), pricing settings, sales authorizations, etc. In one implementation, the media content for a particular digital media asset can be provided as an electronic file. For example, a user may want to change pricing or sales authorizations for various reasons after the original submission. As another example, a user may want to correct an error (e.g., typographical error) in the original submission. As another example, a user might want to upgrade the quality of the media content by resubmitting media content of a higher quality (e.g., greater bit rate). In particular, if the current bit rate is 125 thousand bits per second (kbps) which is a lossy encoding, then the media content quality can be upgraded to 256 kbps which is a lossless encoding. In any case, when the user desires to make one or more changes to the prior submission, the media submission program 110 can present the previously submitted media asset data so that the user can in most cases simply make changes to such data. After the changes have been made, the media submission program 110 can resubmit the corresponding media asset such that the media distribution site 102 knows to update at least a portion of the previously submitted media asset data with the changed media asset data.

In one embodiment, the media distribution site 102 can receive originally submitted media asset data and make editorial or other changes for various reasons. These changes can be implemented automatically by a computer system or manually by editors. When such changes have been made at the media distribution site 102, the media submission program 110 no longer stores the current media asset data that is used by the media distribution site 102. Hence, prior to making changes to the previously submitted media asset data, the media submission program 110 can receive from the media distribution site 102 any changes that have already taken place at the media distribution site 102 since the original submission of the media asset data. In other words, the media submission program 110 can receive the current media asset data from the media distribution site 102 prior to the user making changes to the media asset data for resubmission. The providing of the current media asset data back to the media submission program 110 can be referred to as a synchronization operation whereby media asset data between the media submission program 110 and the media distribution site 102 can be kept up-to-date.

The submission (including resubmission) and purchase of the media items can be achieved over a data network 106. In other words, the submission and purchase of the media items can be achieved online. The purchase of media items online can also be referred to as electronic commerce (e-commerce). In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The connections through the data network 106 between the media distribution server 102 and the clients 104, 105 can be through secure connections, such as Secure Sockets Layer (SSL). Further, the media content can be re-encrypted prior to storage at the client 104 such that downloaded media content is not stored in the clear, but is instead stored in an encrypted manner.

Figure 2:
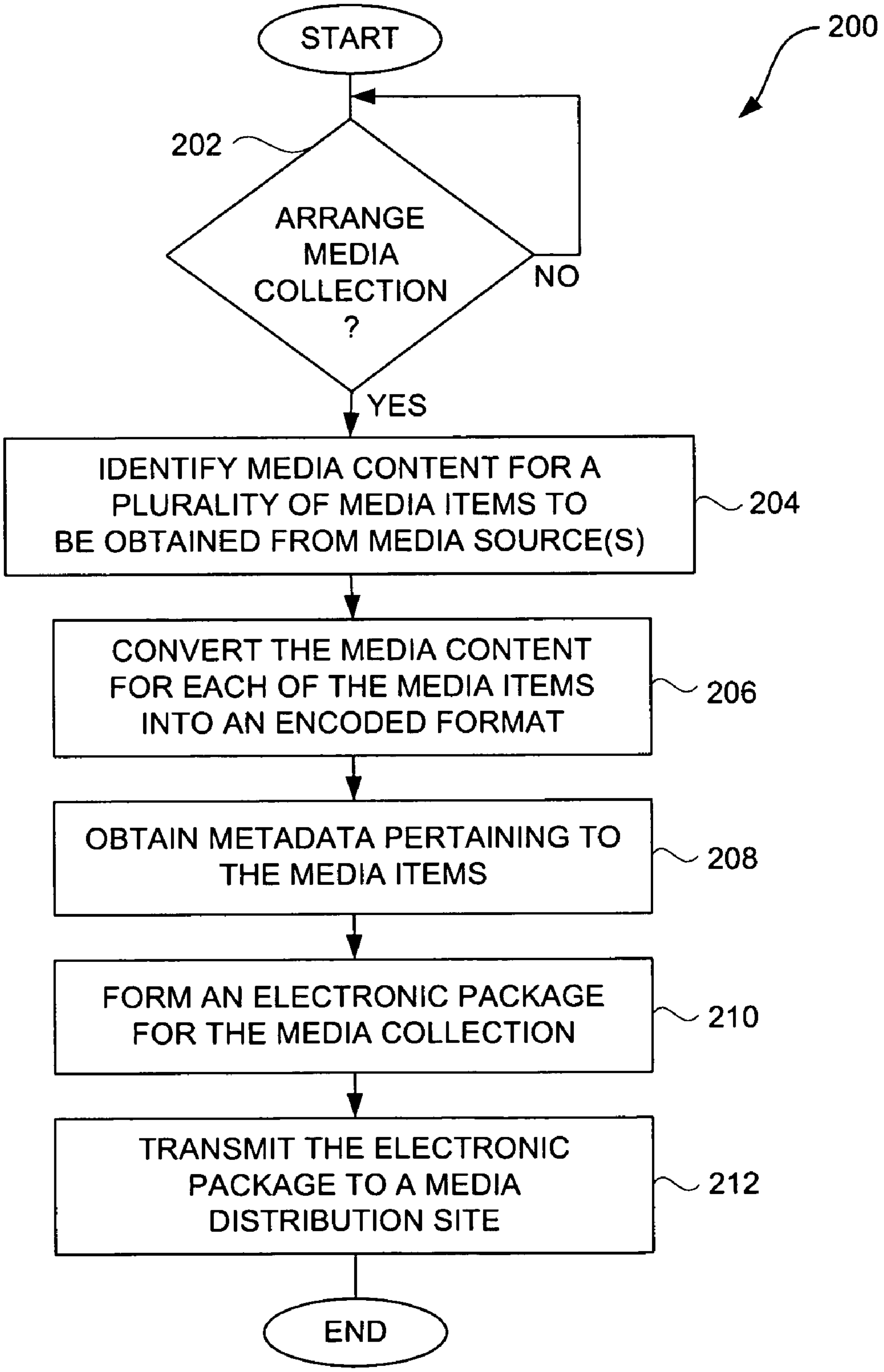
FIG. 2 is a flow diagram of a media submission process according to one embodiment of the invention.

FIG. 2 is a flow diagram of a media submission process 200 according to one embodiment of the invention. The media submission process 200 is typically performed by a client machine, such as the client 105 illustrated in FIG. 1. More particularly, the media submission program 110 at the client 105 illustrated in FIG. 1 can perform the media submission process 200.

The media submission process 200 begins with a decision 202 that determines whether a media collection is to be arranged for submission from a client machine to a server machine (e.g., media distribution site). When the decision 202 determines that a media collection is not to be arranged for submission at this time, then the media submission process 200 awaits a request to arrange a media collection. In other words, the media submission process 200 can be invoked whenever a request to arrange a media collection is received. Typically, a user of the client machine would interact with the client machine (e.g., the media submission program 110) to initiate a request to arrange a media collection.

In any case, once the decision 202 determines that a media collection is to be arranged, media content for a plurality of media items are identified. The identified media content for the media items is to be included within the media collection being arranged. Typically, the media content for these media items is retrieved from one or more media sources. Examples of media sources are compact discs (CDs) or media files. After the media content has been identified 204, the media content for each of the media items is converted 206 into an encoded format. Here, in the case of compact discs, the stored data is in a format that is not suitable for transmission over networks. Hence, typically, the format of the media content from compact disc is converted into an encoded format that is suitable for transmission through networks. Examples of encoded formats for audio files include Advanced Audio Coding (AAC), Apple Lossless, MPEG (e.g., MPEG4), MP3 and M4 files. In many cases, the encoding formats provide compression so that transmission is efficient. The compression can be lossy or lossless.

Next, metadata pertaining to the media items is obtained 208. In one embodiment, the metadata for the media items includes descriptive information regarding the media items.

The metadata is, in one embodiment, provided by a user through interaction with the client machine (e.g., the media submission program 110).

Thereafter, an electronic package is formed 210 for the media collection. The electronic package is, for example, an electronic folder that includes a plurality of files. The plurality of files within the electronic folder include a file for the media content (in its compressed format) for each of the media items, folder metadata, and possibly other files. Here, the folder metadata can include not only the metadata for the media items, but also other metadata pertaining to the media collection and/or the organization of the electronic folder and components within the electronic folder. An example of one type of other file would be a file of an image that is to be associated with the media collection. The image, for example, can pertain to artwork to be utilized in association with the media collection. An example of another type of other file would be a file containing liner notes to be associated with the media collection. After the electronic package has been formed 210, the electronic package can be transmitted 212 to a media distribution site (e.g., server) for online purchase and distribution. The transmission 212 of the electronic package to the media distribution site concludes the media submission process 200.

Advantageously, the electronic packages being formed and transmitted to a media distribution site can have a standard format and arrangement. As a result, the media distribution site is able to process the incoming electronic packages in an automated manner.

Many users of the media submission process 200 can be affiliated with small recording labels or artists that desire to submit their media collections to media distribution sites so that such media collections can be offered for purchase at the media distribution sites. The standardization and uniformity provided by the media submission process 200 significantly reduces the burdens and difficulties otherwise placed on the media distribution sites.

Figure 3A:
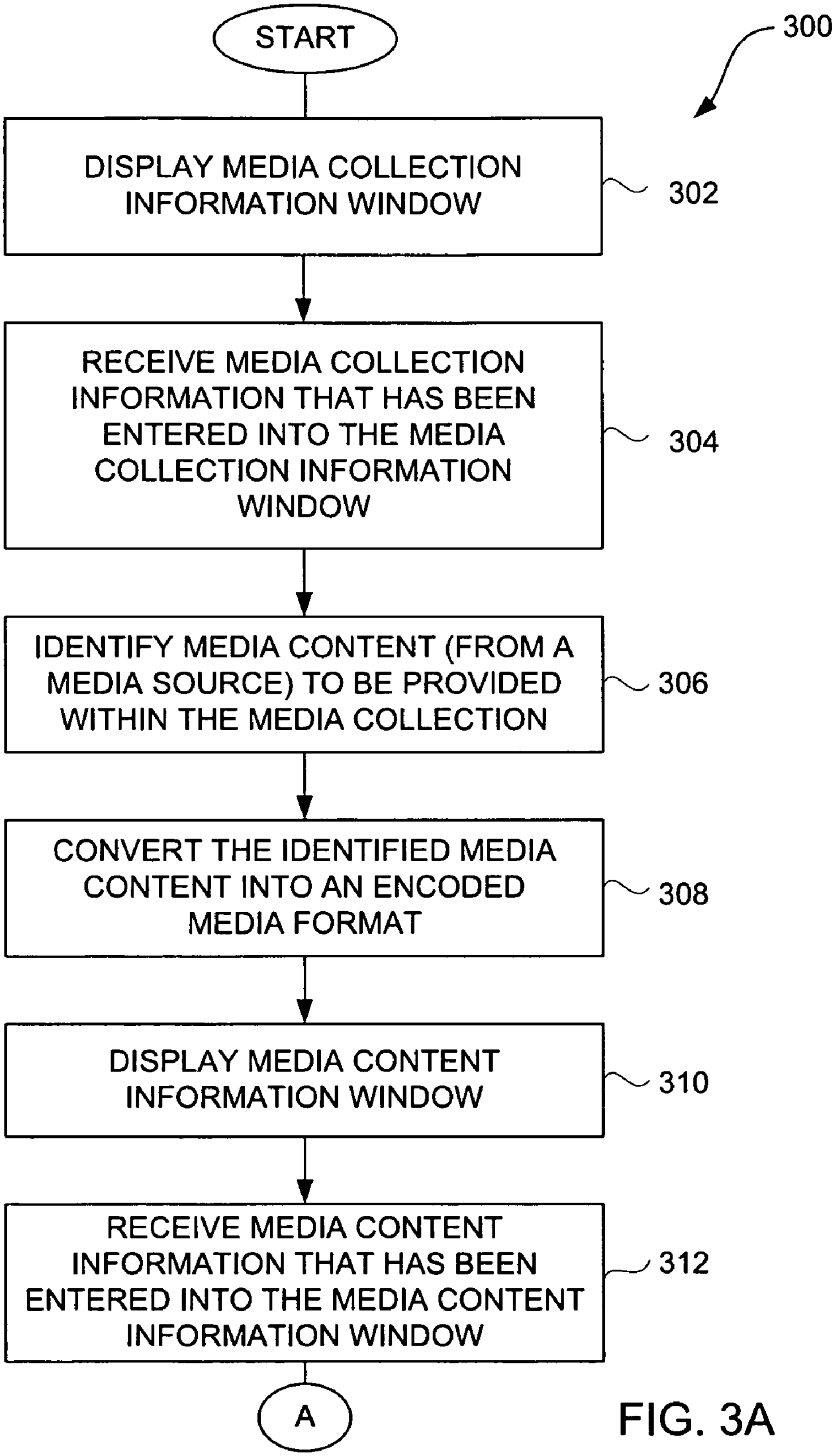
FIGS. 3A and 3B are flow diagrams of a media submission process according to another embodiment of the invention.
Figure 3B:
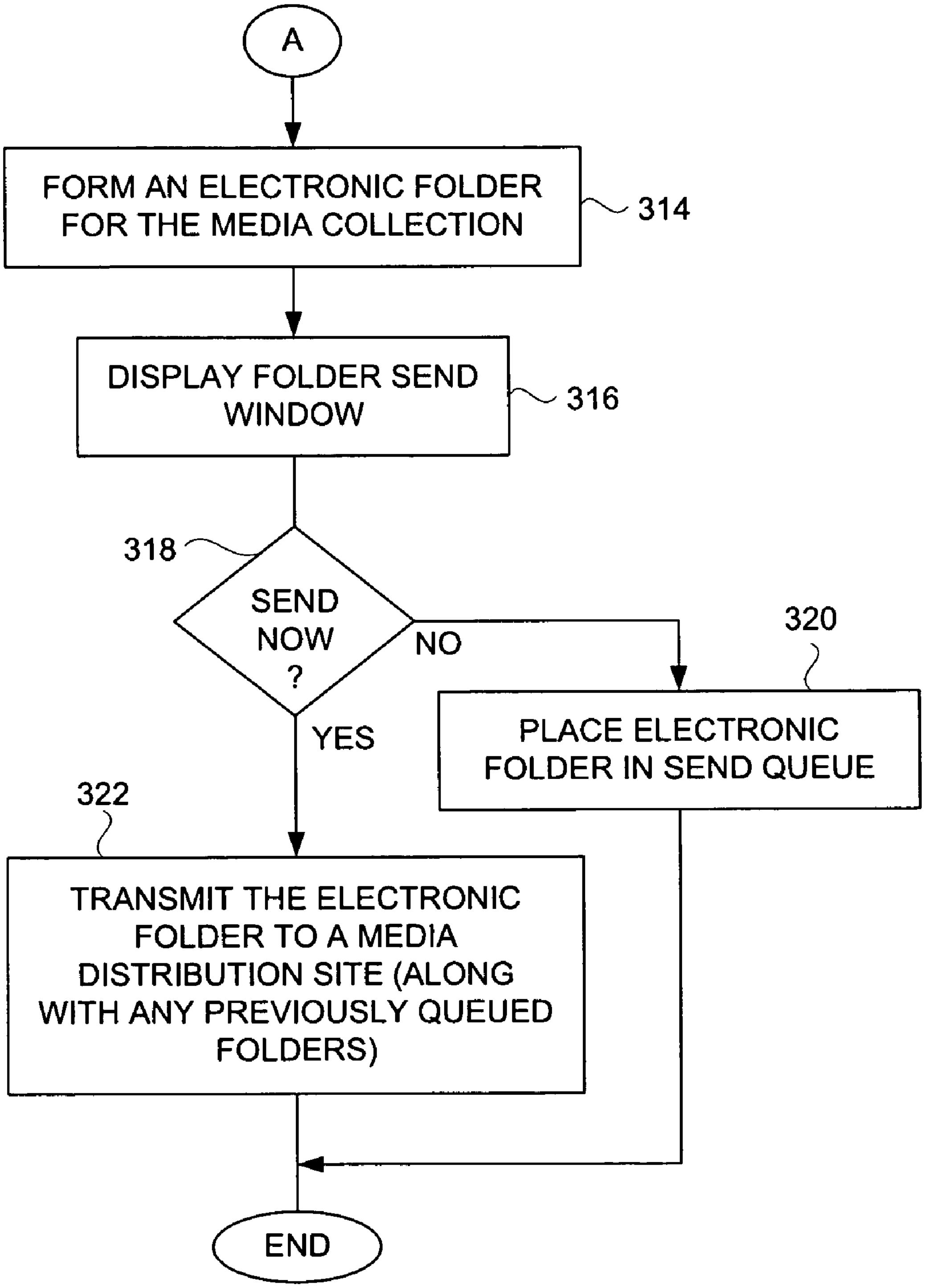

FIGS. 3A and 3B are flow diagrams of a media submission process 300 according to another embodiment of the invention. The media submission process 300 is typically performed by a client machine, such as the client 105 illustrated in FIG. 1. More particularly, the media submission program 110 at the client 105 illustrated in FIG. 1 can perform the media submission process 300.

The media submission process 300 initially displays 302 a media collection information window. Then, media collection information that has been entered into the media collection information window can be received 304. Here, the media submission process 300 receives 304 the media collection information that is entered into media collection information window by a user of the client machine (e.g., user of the media submission program 110).

Next, media content for media items to be provided within the media collection is identified 306. The media content being identified 306 represents that portion of the available media content from one or more media sources that is to be provided within the media collection. Examples of media sources are compact discs (CDs) or media files. In one implementation, to assist a user with the identification 306 of the media content for the media items, an import window can be displayed. The import window would assist the user with the identification of media items/media content to be included within the media collection.

After the media content has been identified 306, the identified media content is converted 308 into an encoded media format. Here, the conversion 308 can be considered to encode the media content from a media source into a digital format suitable for electronic transmission and playing (such as MP3, m4a, AAC, etc.). Encoding, in this context, refers to the process by which traditional forms of audio (e.g., compact disc) and video (e.g., VHS) are converted into a digital format that allows their distribution and broadcast over a network (e.g., the Internet).

Next, a media content information window is displayed 310. The media content information window assists the user to provide media content information regarding one or more of the media items. After the media content information window is displayed 310, media content information that has been entered into the media content information window is received 312. Here, the media submission process 300 receives 312 the media content information that is entered into media content information window by the user of the client machine (e.g., user of the media submission program 110).

After the media content information that has been entered into the media content information window has been received 312, an electronic folder for the media collection is formed 314. The electronic folder includes a plurality of different files, typically some of which are different data types. For example, the media content for each media item within the media collection is provided as a digital media file (e.g., MPEG4 format), and the media collection information and the media content information are provided within a text file (e.g., markup language file, such as an XML file). The text file can also provide a description of the electronic folder that specifies the media and other files within the electronic folder as well as the media collection information and the media content information. If the text file identifies artwork for the media collection or the media items, then the text file specifies an image file (e.g., JPEG format) provided within the electronic folder that contains the artwork image.

Next, a folder send window is displayed 316. The folder send window assists the user in providing user indicia prior to submission of the media collection to the media distribution site. In one implementation, the user indicia is an account identifier and a password. A representative folder send window according to one embodiment of the invention is discussed below with reference to FIG. 5.

After the user indicia has been provided via the folder send window, a decision 318 determines whether the electronic folder is to be sent (i.e., submitted) at this time. Here, the user can decide whether the electronic folder should be submitted at this time. For example, the user can choose whether the electronic folder should be submitted at this time using the folder send window.

When the decision 318 determines that the electronic folder should not be submitted at this time, then the electronic folder is placed 320 in a send queue. Once placed in the send queue, the electronic folder is stored at the client machine until such time as the electronic folder is eventually sent. On the other hand, when the decision 318 determines that the electronic folder should be sent, then the electronic folder is transmitted 322 to the media distribution site. Additionally, if other media collections were earlier queued by the media submission process 300, then any previously queued folders could also be sent to the media distribution site. Following the blocks 320 or 322, the media submission process 300 is complete and ends.

Figure 4:
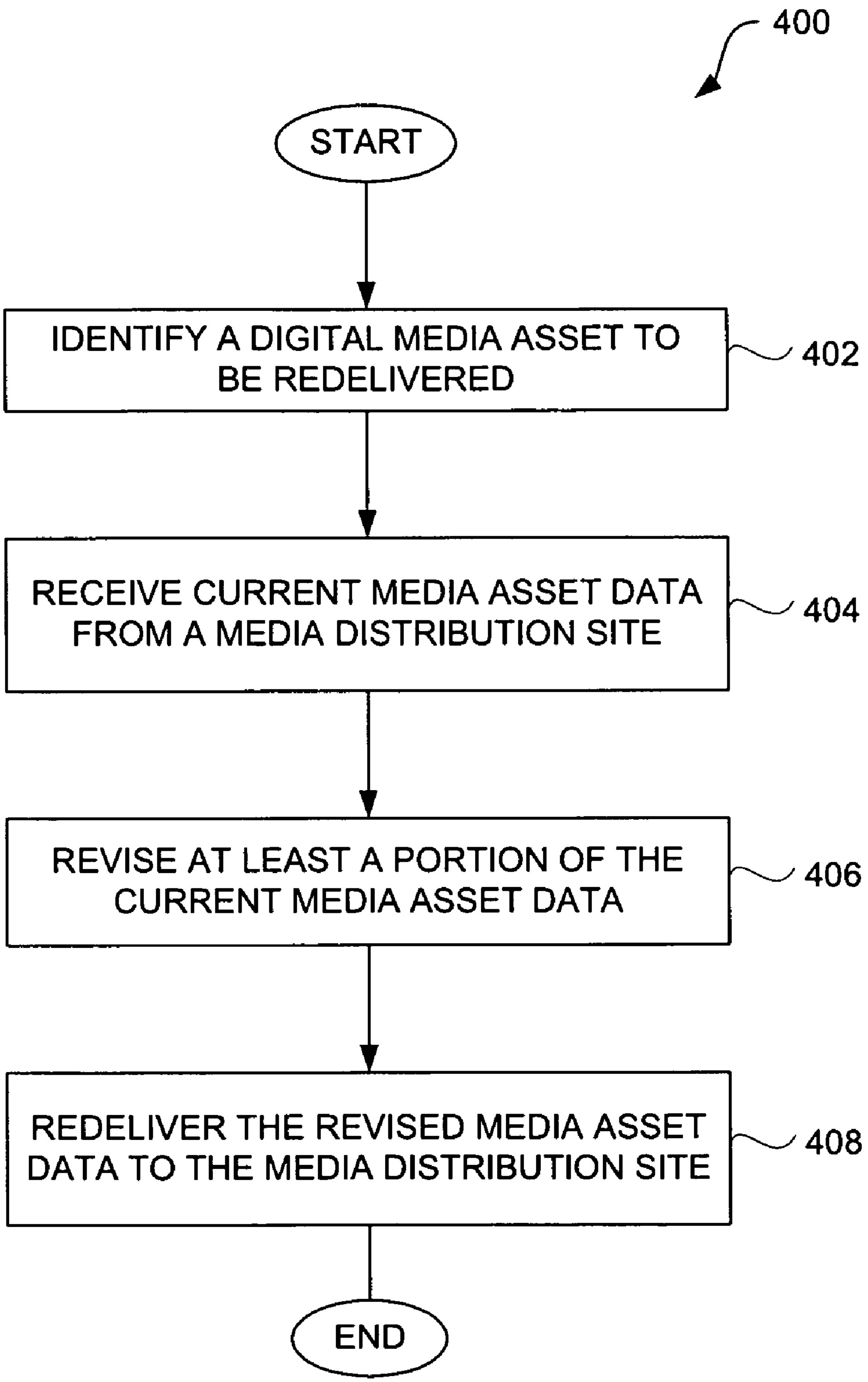
FIG. 4 is a flow diagram of a media resubmission process according to one embodiment of the invention.

FIG. 4 is a flow diagram of a media resubmission process 400 according to one embodiment of the invention. The media resubmission process 400 is typically performed by a client machine, such as the client 105 illustrated in FIG. 1. More particularly, in one embodiment, the media submission program 110 at the client 105 illustrated in FIG. 1 can perform the media resubmission process 400.

The media resubmission process 400 identifies 402 a digital media asset to be redelivered. Here, the digital media asset being identified 402 is one of various digital media assets (media items) that has been previously submitted to a media distribution site. After the digital media asset to be redelivered has been identified 402, current media asset data for the identified digital media asset can be received 404 from the media distribution site. Even though the identified digital media asset was previously delivered (or submitted) to the media distribution site from the client machine, the media asset data stored at the media distribution site may have been altered for various reasons. Hence, the media submission process 400 receives 404 the current media asset data from the media distribution site so that the media resubmission process 400 has the most current version of the media asset data.

Following the receipt 404 of the current media asset data, at least a portion of the current media asset data can be revised 406. In one embodiment, the current media asset data can include current media asset information and/or media content of the current media asset. The current media asset information can pertain to media item identifiers, metadata (data descriptive of the media), pricing settings, sales authorizations, etc. The media content for the current media asset can be provided as media data in an electronic file.

Next, the revised media asset data can be redelivered 408 to the media distribution site. At this point, the media asset data associated with the identified digital media asset has been revised 406 and redelivered 408 to the media distribution site. The media distribution site can thereafter utilize the revised media asset data in making the identified digital media asset available for distribution at the media distribution site. Following the block 408, the media resubmission process 400 can end. However, the media resubmission process 400 can be invoked for each of a number of different digital media assets that are to be redelivered to the media distribution site.

Figure 5A:
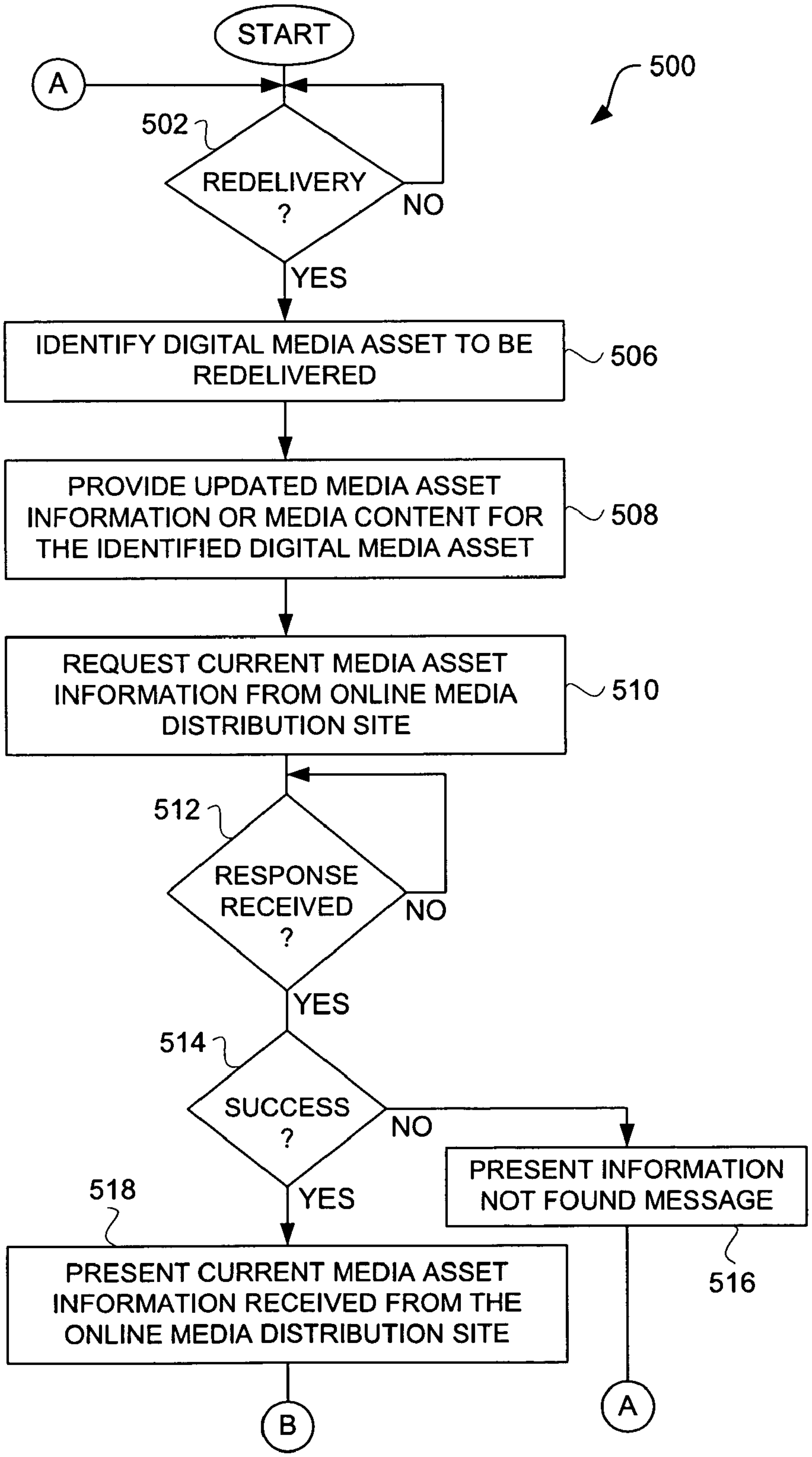
FIGS. 5A and 5B are flow diagrams of a media redelivery process according to another embodiment of the invention.
Figure 5B:
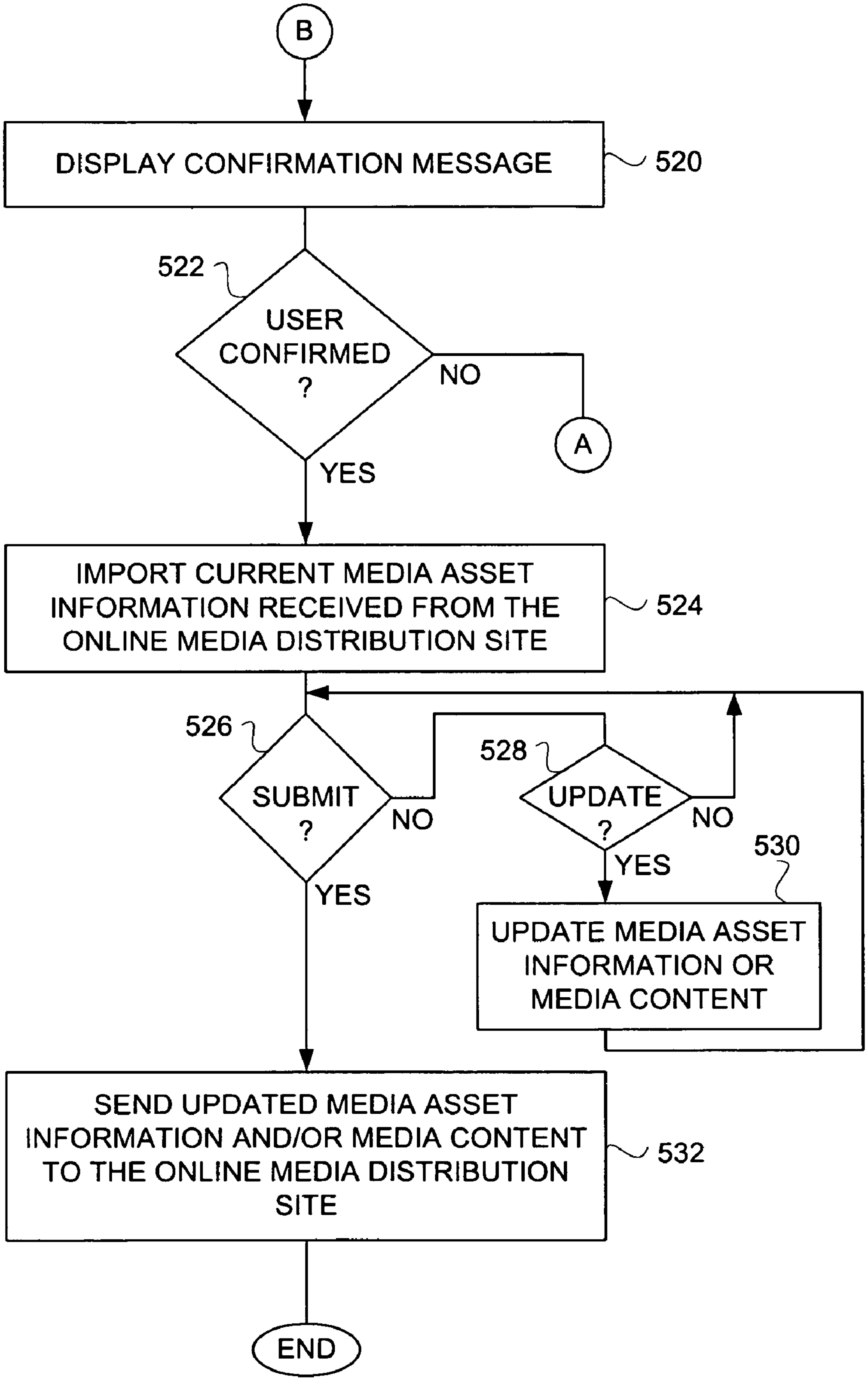

FIGS. 5A and 5B are flow diagrams of a media redelivery process 500 according to another embodiment of the invention. The media redelivery process 500 is typically performed by a client machine, such as the client 105 illustrated in FIG. 1. More particularly, in one embodiment, the media redelivery program 110 at the client 105 illustrated in FIG. 1 can perform the media redelivery process 500.

The media redelivery process 500 can begin with a decision 502. The decision 502 determines whether redelivery of a digital media asset (media item) is to be performed. When the decision 502 determines that redelivery of a digital media asset is not to be performed, the media redelivery process 500 can wait until a redelivery is to be performed. Once the decision 502 determines that redelivery of a digital media asset is to be performed, the media redelivery process 500 can continue. In this regard, a digital media asset to be redelivered is identified 506. Updated media asset information or media content for the identified digital media asset can then be provided. For example, a user can interact with a graphical user interface to enter certain media asset information that is being updated or to identify particular media content that is to be utilized for the identified digital media asset.

Next, current media asset information from the online media distribution site can be requested 510. Here, in the online media distribution site is deemed to store the most current media asset information for the identified digital media asset. Hence, the request 510 for the current media asset information can be obtained from the online media distribution site. After the request for the current media asset information has been sent to the online media distribution site, a decision 512 can determine whether a response to the request for the current media asset information has been received. When the decision 512 determines that the response to the current media asset information has not been received, the immediate redelivery process 500 can await such a response.

Once the decision 512 determines that a response has been received, a decision 514 can determine whether the response was successful. If the response was not successful, then an information not found message can be presented 516 to the user. Alternatively, when the decision 514 determines that the response received was successful, current media asset information received from the online media distribution site can be presented 518. For example, the current media asset information can be presented 518 all on the client 105 illustrated in FIG. 1. Here, in one embodiment, only a portion of the current media asset information is displayed. In any case, after some or all of the current media asset information that has been received from the online media distribution site is presented 518, a confirmation message can be displayed 520. The confirmation message can request that the user confirm that the current media asset information that has been received from the online media distribution site pertains to the correct media asset. In one implementation, the confirmation message can be displayed concurrently with the presentation 518 of some or all of the current media asset information.

Next, a decision 522 determines whether the user has confirmed that the current media asset information being presented 518 is the correct digital media asset that is to be redelivered. When the decision 522 determines that the user has not confirmed the current media asset information being presented 518 (i.e., current media asset information is not the correct digital media asset to be redelivered), the media redelivery process 500 can return to repeat the decision 502 so that the processing can be restarted again since the prior attempt was unsuccessful. On the other hand, when the decision 522 determines that the user has confirmed the current media asset information being presented 518 as being the correct digital media asset that is to be redelivered, the current media asset information received from the online media distribution site can be imported 524 to the identified digital media asset. For example, in the media redelivery process 500 can present a media asset redelivery screen on a display device that permits the entry of media asset information. The importing 524 of the current media asset information can operate to automatically populate the media asset redelivery screen with the current media asset information received from the online media distribution site.

A decision 526 then determines whether the user has requested to submit the digital media asset to the online media distribution site. When the decision 526 determines that the user has not yet requested to submit the digital media asset, a decision 528 determines whether an update action has been requested. When the decision 528 determines that an update action has been requested, the media asset information or the media content associated with the identified digital media asset can be updated 530. Following the block 530, or following the decision 528. When an update action has not been requested, the media redelivery process 500 can return to repeat the decision 526. Once the decision 526 determines that the user has requested to submit the digital media asset, the updated media asset information and/or media content can be sent 532 to the online media distribution site. Consequently, the media redelivery process 500 has sent the updated information and/or media content to the online media distribution site. At the online media distribution site, further processing can be performed to permit the online media distribution site to update its records to correspond to the updated media information and/or media content that has been sent 532. Following the block 532, the media redelivery process 500 can end.

Figure 6:
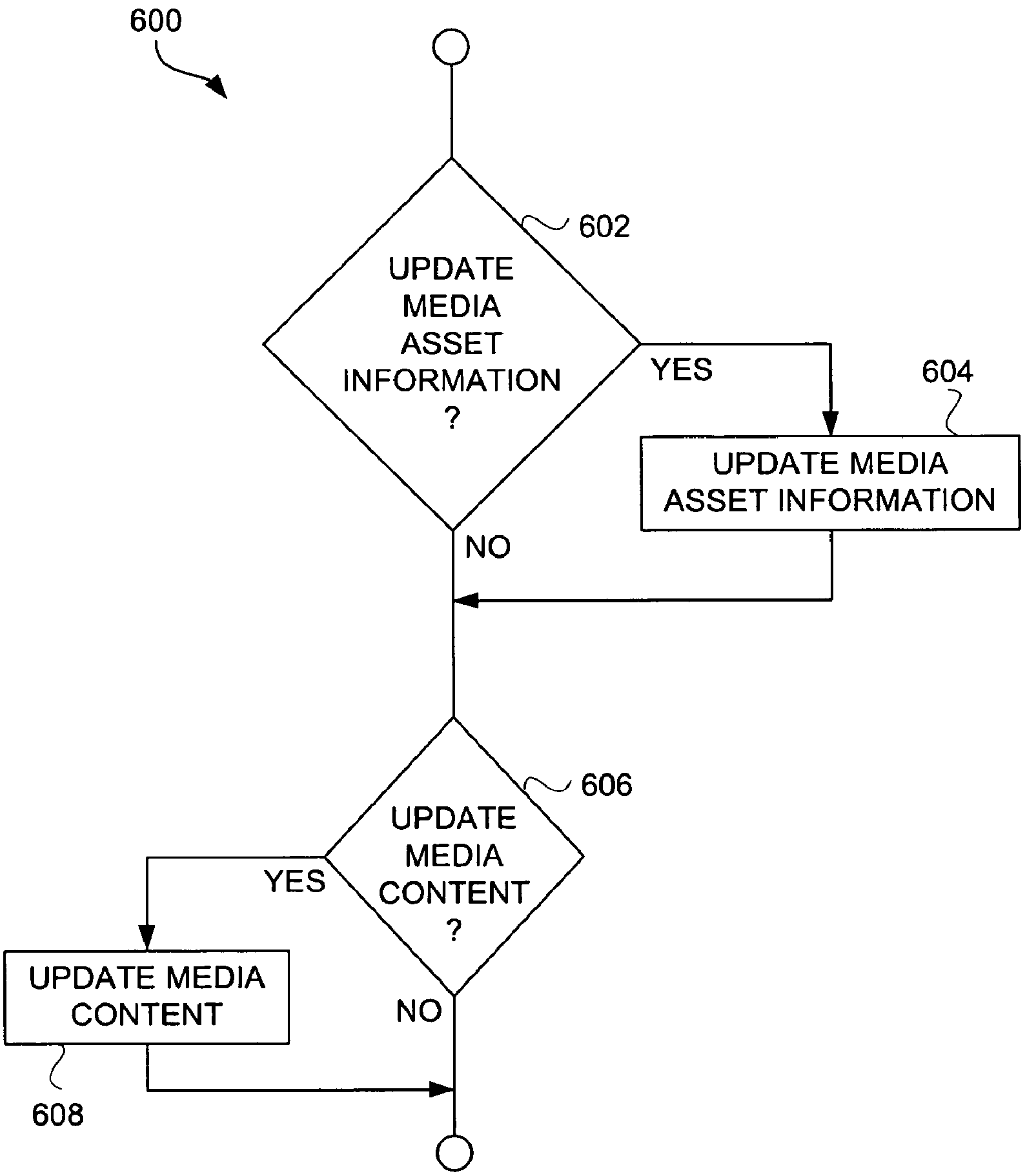
FIG. 6 is a flow diagram of an update media process according to one embodiment of the invention.

FIG. 6 is a flow diagram of an update media process 600 according to one embodiment of the invention. The update media process 600 can, for example, pertain to processing that can be performed by the block 508 and/or the block 530 of the media redelivery process 500 illustrated in FIGS. 5A and 5B.

The update media process 600 can begin with a decision 602. The decision 602 can determine whether media asset information is to be updated. When the decision 602 determines that media asset information is to be updated, the media asset information can then be updated 604. In the case of the block 508, the media asset information being updated can pertain to information provided locally. However, in the case of the block 530, the media asset information being updated can pertain to the imported media asset information this was received from the online media distribution site. In updating the media asset information, the user can be permitted to edit, modify or replace some or all of the media asset information. In one embodiment, the media asset information can pertain to media identifiers, metadata (data descriptive of the media), pricing settings, sales authorizations, etc. for the corresponding media asset.

On the other hand, when the decision 602 determines that the media asset information is not be updated, the update media process 600 can perform a decision 606. Also, the decision 606 can be performed following the block 604. At the decision 606, a determination can be made as to whether media content is to be updated. When the decision 606 determines that the media content is to be updated, the media content can be updated 608. For example, the prior submission of the media asset could have included media content in the form of an electronic file associated with the media submission. Here, the media content can be updated 608 by associating a new file containing the updated media content for the media asset. Following the block 608, as well as following the decision 606 when the media content is not to be updated, the update media process 600 can end. The update media process 600 is thus able to assist a user in modifying either or both of media asset information and media content for a particular media asset.

In one embodiment, the media redelivery process 500 can be activated automatically when a digital media asset at the client machine is found to have a low quality media asset. For example, if a playlist has one or more tracks that are lossy (e.g., encoded at less than 256 kbps), then that playlist can be flagged as a candidate for redelivery so that media content for the digital media asset can be redelivered with lossless encoding (e.g., encoded with at least 256 kbps).

Figure 7A:
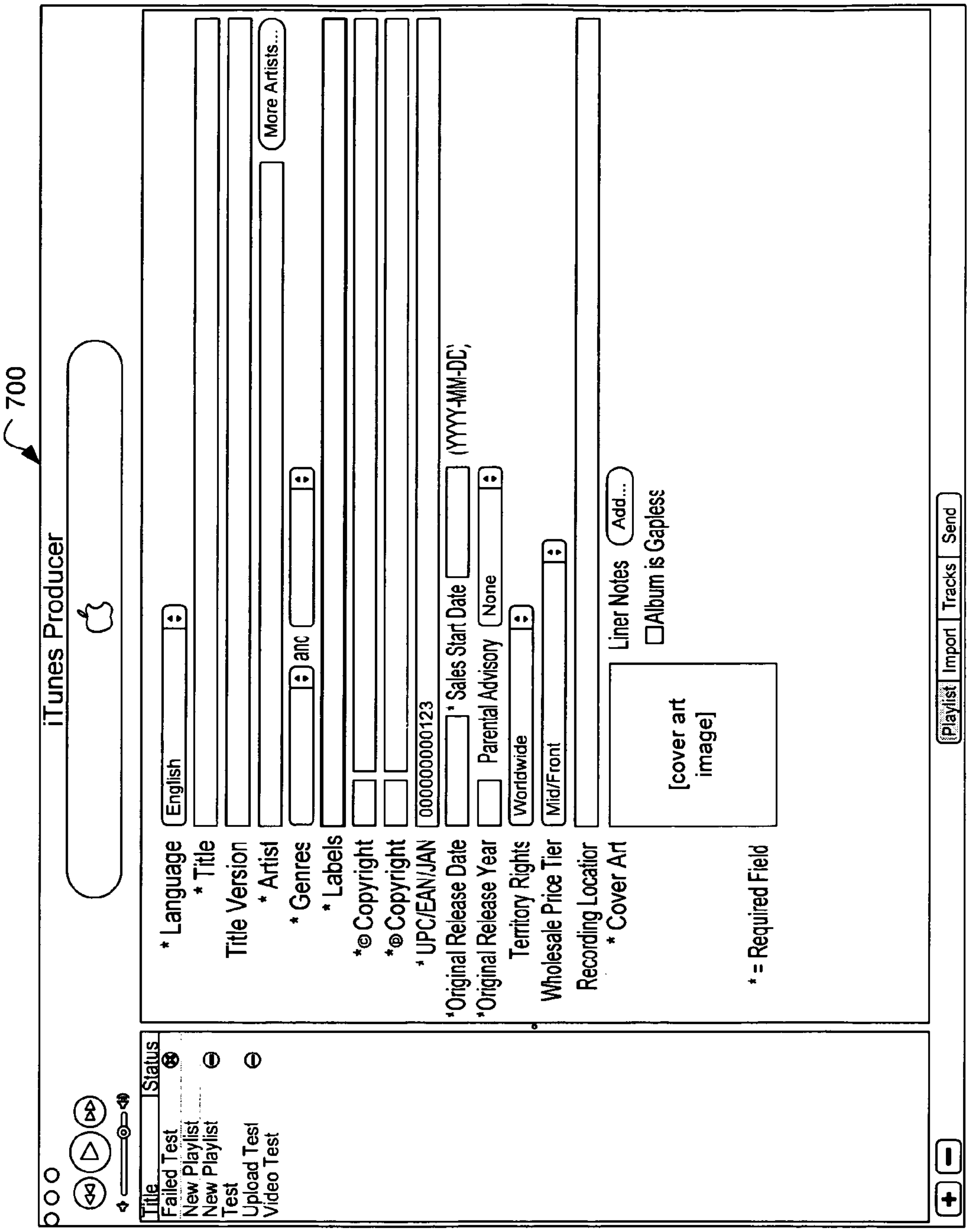
FIG. 7A is a screenshot illustrating a representative media collection information window according to one embodiment of the invention.

FIG. 7A is a screenshot illustrating a representative media collection information window 700 according to one embodiment of the invention. A user can interact with the media collection information window 700 to enter the media collection information. Using the media collection information window 700, media collection information, such as language, title, title kind (e.g., live, remix, etc.), artist, genre, label (i.e., music label), copyright, SKU, UPC, EAN, JAN, release date, sales start date, original release year, parental advisory, territory rights, wholesale price tier, recording location, liner notes, and cover art, can be provided. As shown in FIG. 7A, the media collection information window 700 has the media identifier (e.g., UPC) for a previously submitted media collection that is to be resubmitted.

Figure 7B:
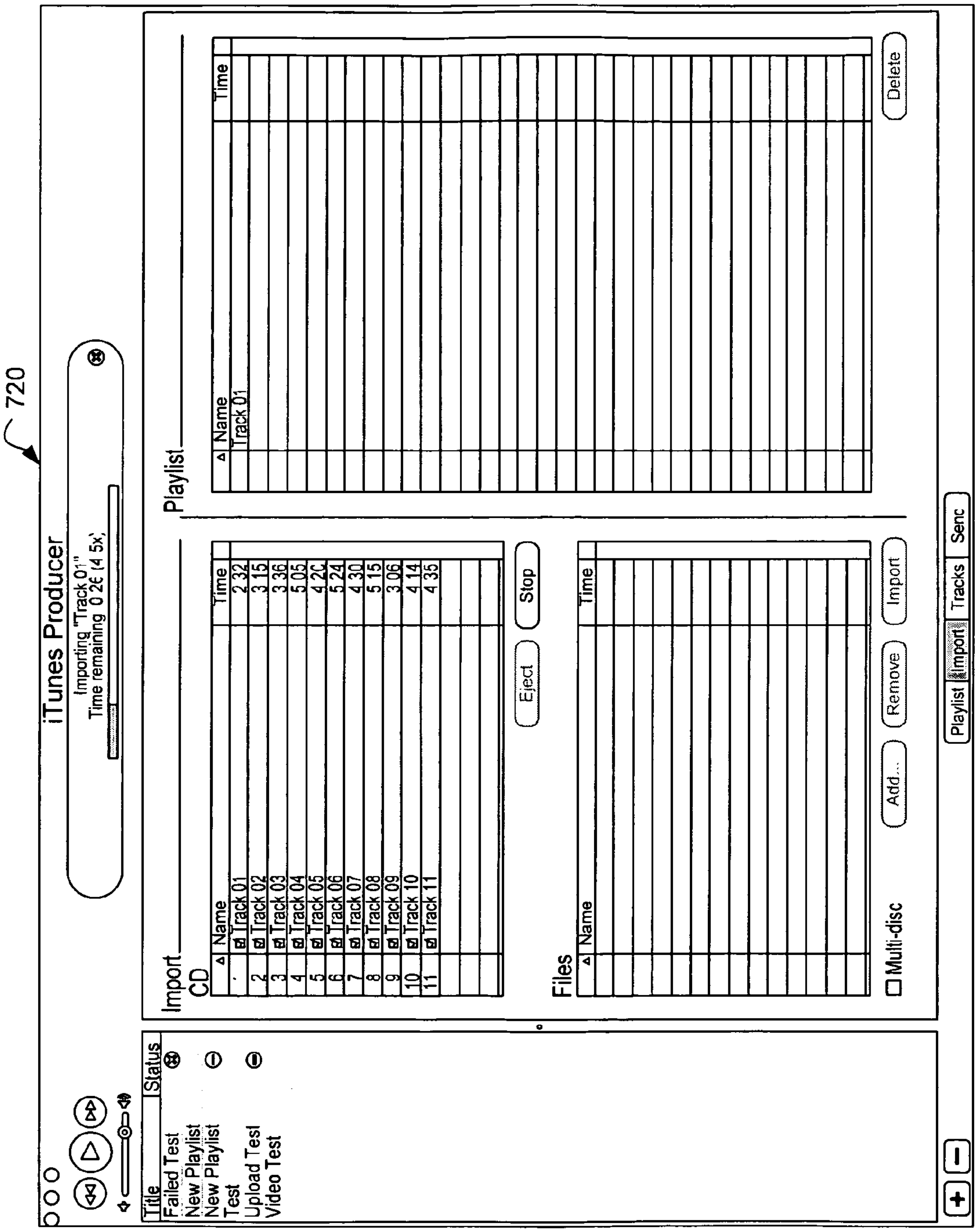
FIG. 7B is a screenshot illustrating a representative import window according to one embodiment of the invention.

FIG. 7B is a screenshot illustrating a representative import window 720 according to one embodiment of the invention. The import window 720 assists a user with importing media items from media sources. Here, for the media collection "New Playlist", eleven (11) media items (i.e., tracks) have been designated for import from import sources denoted "CD" or "Files." The media collection is referred to as a playlist. In the case of a resubmission, these media items to be imported represent media content that is to be used for the media collection that was previously submitted.

Figure 7C:
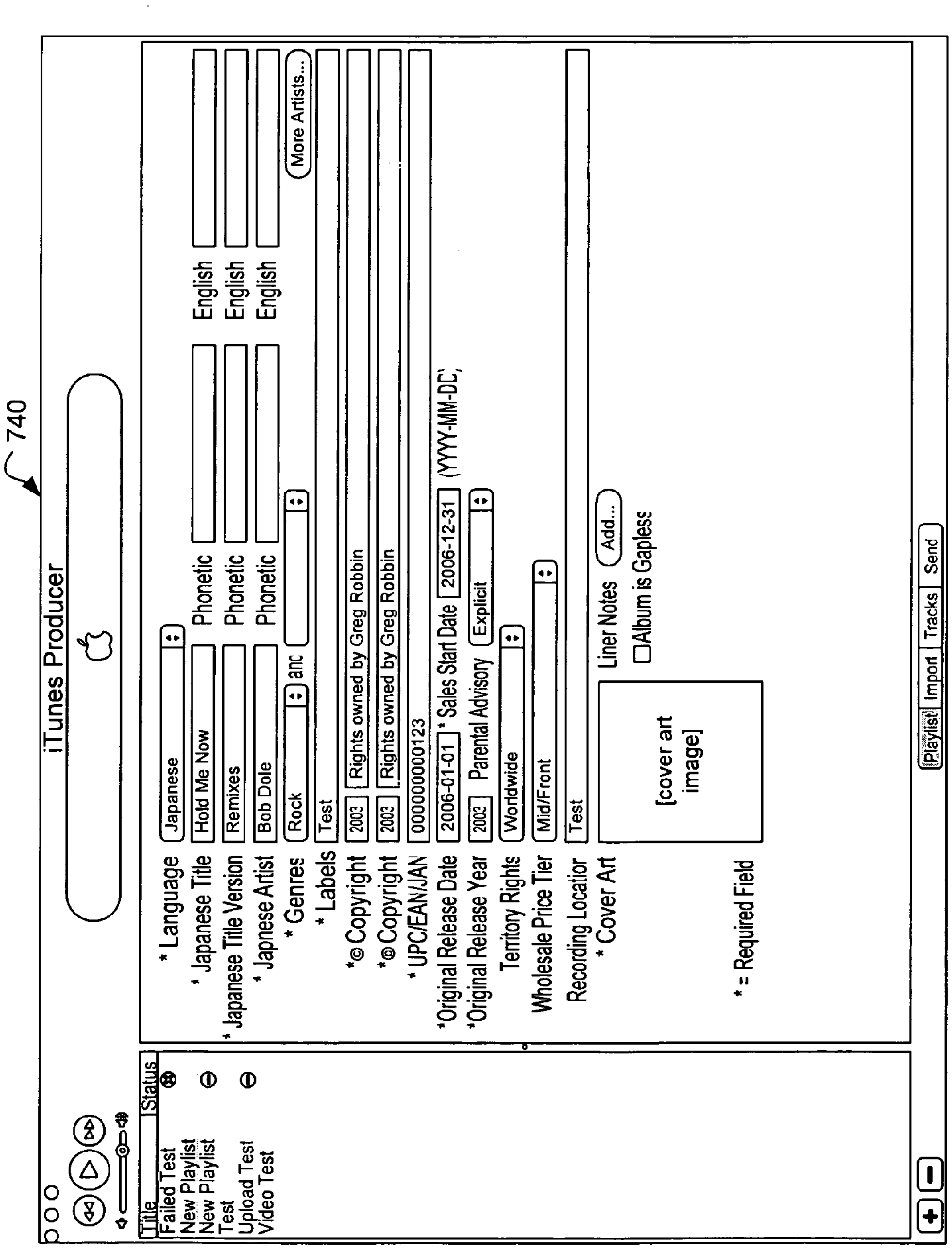
FIG. 7C is a screenshot illustrating a representative media collection information window according to one embodiment of the invention.

FIG. 7C is a screenshot illustrating a representative media collection information window 740 according to one embodiment of the invention. The media collection information window 740 can correspond to the media collection information window 700 after current media collection information has been acquired from the online media distribution site. Here the media collection information window 740 is populated to include the current media collection information, such as language, title, title kind (e.g., live, remix, etc.), artist, genre, label (i.e., music label), copyright, SKU, UPC, EAN, JAN, release date, sales start date, original release year, parental advisory, territory rights, wholesale price tier, recording location, liner notes, and cover art, can be provided. The user can then interact with the current media collection information window 700 to update or modify the media collection information for resubmission.

Figure 8:
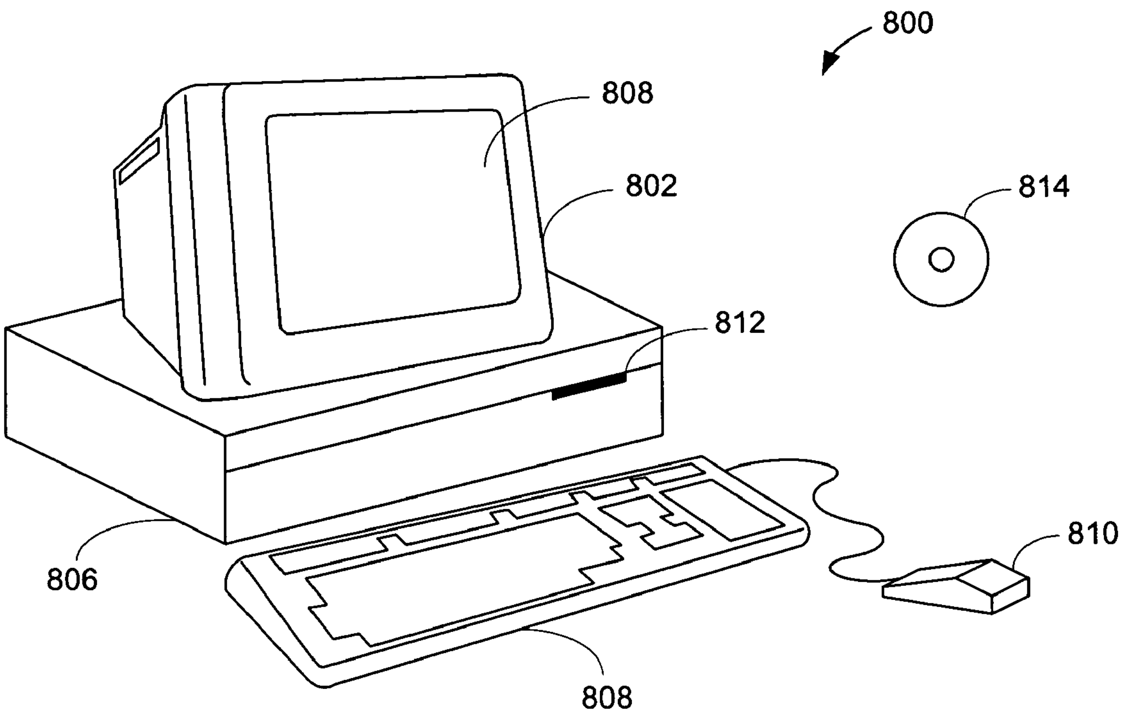
FIG. 8 shows an exemplary computer system suitable for use with at least one embodiment of the invention.

FIG. 8 shows an exemplary computer system 800 suitable for use with at least one embodiment of the invention. The methods, processes and/or graphical user interfaces discussed above can be provided by a computer system. The computer system 800 includes a display monitor 802 having a single or multi-screen display 804 (or multiple displays), a cabinet 806, a keyboard 808, and a mouse 810. The mouse 810 is representative of one type of pointing device. The cabinet 806 houses a processing unit (or processor), system memory and a hard drive (not shown). The cabinet 806 also houses a drive 812, such as a DVD, CD-ROM or floppy drive. The drive 812 can also be a removable hard drive, a Flash or EEPROM device, etc. Regardless, the drive 812 may be utilized to store and retrieve software programs incorporating computer code that implements some or all aspects of the invention, data for use with the invention, and the like. Although CD-ROM 814 is shown as an exemplary computer readable storage medium, other computer readable storage media including floppy disk, tape, Flash or EEPROM memory, memory card, system memory, and hard drive may be utilized. In one implementation, a software program for the computer system 800 is provided in the system memory, the hard drive, the drive 812, the CD-ROM 814 or other computer readable storage medium and serves to incorporate the computer code that implements some or all aspects of the invention.

Additional information on media submission can be found in U.S. Patent Publication No. 2004/0254883 A1 and U.S. Patent Publication No. 2007/0083471 A1, both of which are incorporated herein by reference.

The digital media assets (i.e., media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that submission or resubmission of media to online media hosting sites can be achieved with uniformity. The uniformity eases the burden on representatives of the online media hosting sites to process the media submissions. Another advantage of the invention is that media submissions or resubmissions can be processed in an automated manner. Still another advantage of the invention is that media asset data from a previous submission can be subsequently updated and resubmitted. Yet still another advantage of the invention is that current media asset data at a media distribution site can retrieved and provided to a client. Once the current media asset data has been obtained at the client, the current media asset data can be updated and resubmitted.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for redelivering a digital media asset to a media distribution system, said method comprising:

identifying a digital media asset to be redelivered, wherein the identified digital media asset was previously delivered to and currently stored in the media distribution system;

receiving at least current media asset data for the identified digital media asset from the media distribution system;

receiving a revision for at least a portion of the current media asset data to produce revised media asset data; and redelivering the revised media asset data to the media distribution system.

2. A method as recited in claim 1, wherein the current media asset data includes at least current media asset information and current media content.

3. A method as recited in claim 2, wherein said receiving of the revision comprises receiving one or more revisions to at least a portion of the current media asset information.

4. A method as recited in claim 2, wherein said receiving of the revision comprises receiving one or more replacements for at least a portion of the current media content.

5. A method as recited in claim 4, wherein the one or more replacements comprise replacements for at least a portion of the current media content with updated media content encoded at a greater bit rate.

6. A method as recited in claim 1, wherein said identifying comprises:

automatically identifying one or more low quality digital media assets on a client device; and displaying one or more visual indications for the identified one or more low quality digital media assets.

7. A method as recited in claim 6, wherein said identifying comprises:

automatically identifying one or more playlists that include at least one digital media asset with a lower bit rate than 256 kbps; and displaying an indication for each of the identified one or more playlists.

8. A method as recited in claim 1, wherein the digital media asset is a playlist.

9. A method for resubmitting a digital media asset to a media distribution system, said method comprising:

identifying a digital media asset to be resubmitted;

requesting current media asset information for the identified digital media asset from the media distribution system;

receiving the current media asset information for the identified digital media asset from the media distribution system;

receiving revisions to at least a portion of the current media asset information to produce updated media asset information; and submitting the updated media asset information to the media distribution system.

10. A method as recited in claim 9, wherein said method further comprises:

associating updated media content to the updated media asset information, and wherein said submitting operates to submit the updated media asset information and the updated media content to the media distribution system.

11. A method as recited in claim 10, wherein following said submitting, the media distribution system utilizes the updated media content instead of the current media content.

12. A method as recited in claim 11, wherein the updated media content is encoded at a greater bit rate that the current media content.

13. A method as recited in claim 9, wherein the current media asset information is stored by the media distribution system and used by the media distribution system to distribute the identified digital media asset online, and wherein, after said submitting, the updated media asset information is stored by the media distribution system and used by the media distribution system to distribute the identified digital media asset online.

14. A method as recited in claim 9, wherein the digital media asset is a playlist.

15. A computer readable medium including at least tangibly computer program code stored thereon for redelivering a digital media asset to a media distribution system, said computer readable medium comprising:

computer program code for identifying a digital media asset to be redelivered, wherein the identified digital media asset was previously delivered to and currently stored in the media distribution system;

computer program code for receiving at least current media asset data for the identified digital media asset from the media distribution system;

computer program code for receiving at least one revision to at least a portion of the current media asset data to produce revised media asset data; and computer program code for redelivering the revised media asset data to the media distribution system.

16. A computer readable medium as recited in claim 15, wherein said computer program code for identifying comprises:

computer program code for identifying one or more digital media assets on a client device having a lossy encoding.

17. A computer readable medium as recited in claim 16, wherein said computer program code for identifying comprises:

computer program code for displaying one or more visual indications for the identified one or more digital media assets having a lossy encoding.

18. A computer readable medium as recited in claim 15, wherein the digital media asset is a playlist.

19. A computer readable medium as recited in claim 15, wherein the current media asset data includes at least current media asset information and current media content.

20. A computer readable medium as recited in claim 19, wherein said computer program code for receiving of at least one revision comprises receiving one or more replacements for at least a portion of the current media content.

21. A computer readable medium as recited in claim 20, wherein the one or more replacements comprise replacements for at least a portion of the current media content with updated media content encoded at a greater bit rate.

22. A method as recited in claim 20, wherein said computer program code for receiving of the revision comprises receiving one or more revisions to at least a portion of the current media asset information.

23. A computer readable medium including at least tangibly computer program code stored thereon for resubmitting a digital media asset to a media distribution system, said computer readable medium comprising:

computer program code for identifying a digital media asset to be resubmitted;

computer program code for requesting current media asset information for the identified digital media asset from the media distribution system;

computer program code for receiving the current media asset information for the identified digital media asset from the media distribution system;

computer program code for associating updated media content to the updated media asset information;

computer program code for revising at least a portion of the current media asset information to produce updated media asset information; and computer program code for submitting the updated media content and/or the updated media asset information to the media distribution system.

24. A system, comprising:

means for submitting a plurality of digital media assets to a media distribution system, where client media asset data pertaining to each of the digital media assets;

means for identifying one of the digital media assets to be resubmitted;

means for obtaining at least server media asset data for the identified digital media asset from the media distribution system;

means for revising at least a portion of the server media asset data to produce revised client media asset data; and means for resubmitting the revised client media asset data to the media distribution system.

* * * * *

UNITED STATES PATENT AND TRADEMARK OFFICE

CERTIFICATE OF CORRECTION

PATENT NO. : 7,756,920 B2
APPLICATION NO. : 11/946711
DATED : July 13, 2010
INVENTOR(S) : Max Muller et al.

It is certified that error appears in the above-identified patent and that said Letters Patent is hereby corrected as shown below:

On Sheet 1 of 12, in Figure 1, Element 103, line 1, delete "MEDA" and insert -- MEDIA --.

In column 14, line 38, in Claim 12, delete "that the" and insert -- than the --.

In column 15, line 25, in Claim 22, delete "method" and insert -- computer readable medium --.

Signed and Sealed this
Fifteenth Day of November, 2011

David J. Kappos
*Director of the United States Patent and Trademark Office*